Figure 1:
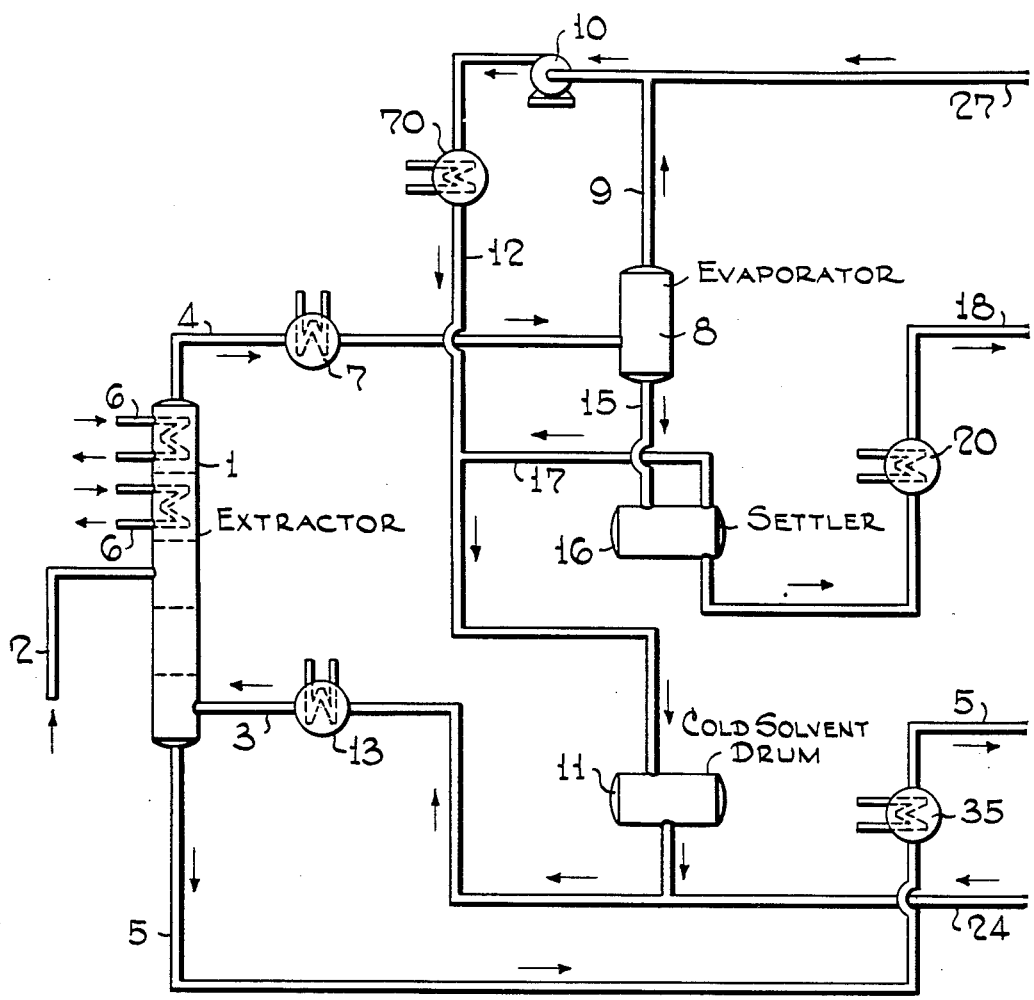
Figure 1A:
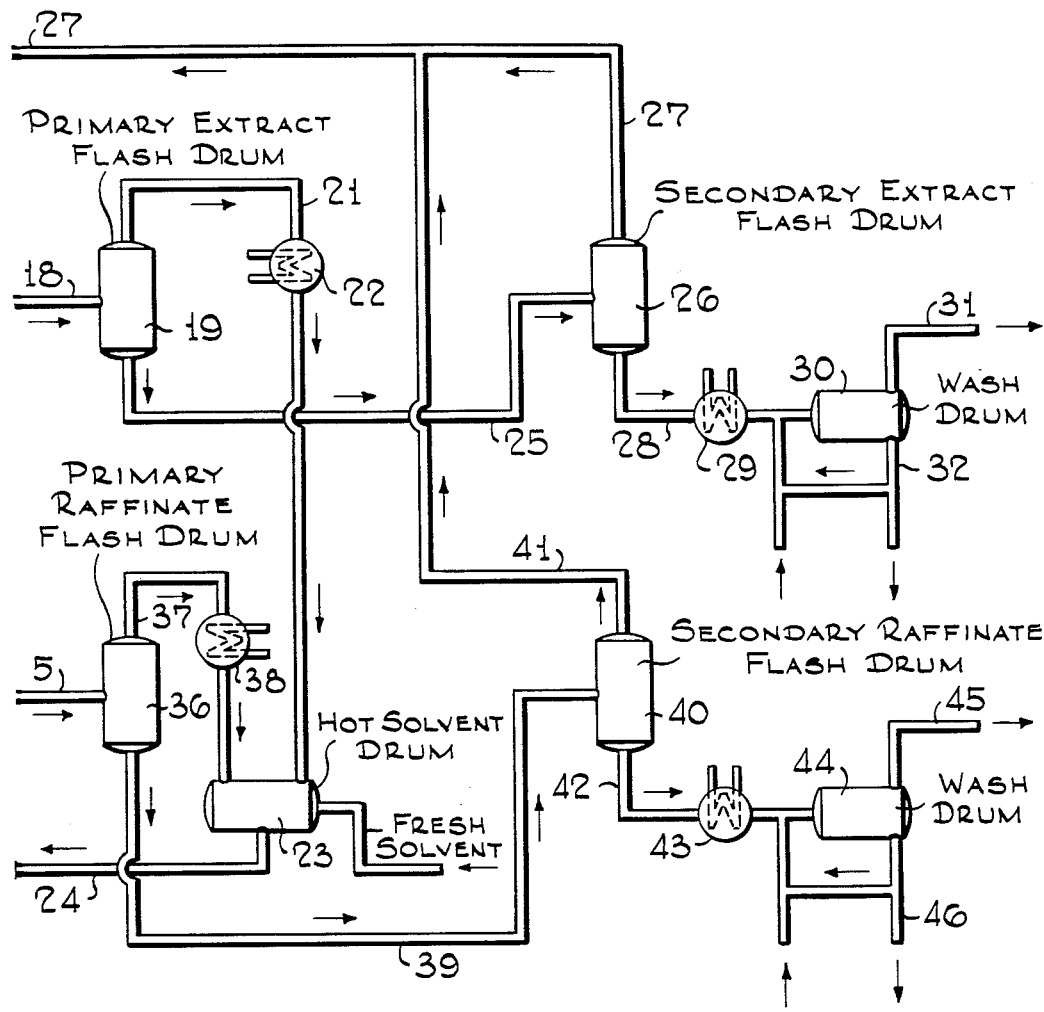

Oct. 18, 1955 M. R. FENSKE 2,721,164
AMMONIA EXTRACTION PROCESS
Filed Dec. 22, 1950 3 Sheets-Sheet 1

Merrell R. Fenske Inventor
By W. O. J. Heilman Attorney

United States Patent Office 2,721,164
Patented Oct. 18, 1955

2,721,164

AMMONIA EXTRACTION PROCESS

Merrell R. Fenske, State College, Pa., assignor to Esso Research and Engineering Company, a corporation of Delaware Application December 22, 1950, Serial No. 202,254

16 Claims. (Cl. 196—13)

This invention concerns an extraction process employing an ammonia type solvent. In particular, the invention concerns the extraction procedure to be employed with an ammonia type solvent, and especially concerns the technique of solvent recovery and recycle. The process is particularly intended to provide an attractive, economic process, minimizing the expense of the solvent recovery phases of the operation.

U. S. Patents Nos. 2,396,299; 2,396,300; 2,396,301; 2,396,302; and 2,396,303; all issued on March 12, 1946, broadly concern refining of hydrocarbon oils with ammonia type solvents. These patents disclose the manner in which the solvent power of ammonia is modified so as to permit the attractive utilization of ammonia together with solvent modifiers in extraction processes. The present process is closely related to the processes disclosed in these U. S. patents. However, the process of this invention supplies an improved method of conducting a process of the general type disclosed in the identified patents, minimizing the heat requirements and the expense of solvent recovery operations.

It is well known that mineral oils such as petroleum oils contain various types of hydrocarbon constituents which may be selectively segregated from these oils by use of a wide range of selective solvents. As disclosed in the patents referred to, an ammonia type solvent, which, by definition, identifies ammonia together with a solvent modifier, has particular advantages for certain types of solvent extraction, however. An outstanding advantage of ammonia type solvents is that such solvents are relatively inert. For example, at the present time a need exists for the upgrading of catalytically cracked stocks by means of a solvent extraction operation. Solvents other than ammonia type solvents, such as sulfur dioxide, are unsatisfactory for this operation due to their reactivity with a cracked stock. Consequently an ammonia solvent, being relatively inert, is attractive for this and other applications. In this connection, for example, ammonia solvents may be employed to treat refractive catalytic cycle stocks so as to render these stocks more suitable for cracking. Again, ammonia solvents may be employed to upgrade catalytically cracked naphthas by the selective extraction of low octane number constituents of the cracked naphthas.

Another characteristic of ammonia solvents peculiarly characterizing such solvents is the wide variation in solvent power with temperature. Thus, it is possible at a somewhat elevated temperature to secure selective solution or extraction of desired constituents from a feed oil, while on lowering the temperature it is then possible to precipitate these extracted constituents from the ammonia. This characteristic of ammonia solvents makes possible the control of the extraction by the solvent and the subsequent precipitation of the extract from the solvent by variation in operating temperatures. By employing this characteristic of ammonia solvents, distillation steps or other relatively expensive separation procedures ordinarily used in extraction processes may be eliminated or minimized.

A third characteristic of ammonia solvents peculiarly characterizing these solvents for use in the process of this invention is the manner in which solvent power of the solvents can be adjusted by use of suitable solvent modifiers. By employing the proper proportions of suitable solvent modifiers, the solvent power of the ammonia may be adjusted to permit the desired extraction of hydrocarbon constituents from a mineral oil while still permitting precipitation of the extract from the ammonia solvent by a suitable drop in temperature. This control of solvent power is an important feature of these ammonia solvents. It makes possible the improvement herein described. It is very desirable that the solubility of the ammonia solvent for the extractable components be so controlled at the extract end of the extractor that these components are incompletely miscible with the ammonia solvent under the conditions of extraction, and furthermore, that the solubility of these extractable components in the ammonia solvent be controlled so that this solubility does not exceed about 25 per cent under the conditions of extraction. The manner in which the solubility of the ammonia solvent is controlled is described in the references given in the second paragraph of this specification.

In accordance with these principles, the present invention concerns an ammonia solvent extraction process in which the solvent power of the ammonia solvent is adjusted to permit the desired extraction to be carried out at a temperature of about 60° to 150° F. After contact of the ammonia solvent with the feed oil at this temperature, the extract phase consisting of the ammonia together with dissolved or extracted hydrocarbons, is then subjected to a cooling operation resulting in the substantial precipitation of the extracted hydrocarbons from the ammonia. During this phase of the operation the extract phase is cooled to temperatures of about +20° F. to —40° F. to obtain phase separation between the ammonia solvent and hydrocarbons present in the extract phase. Residual solvent in the chilled extract and solvent dissolved in the raffinate from the contacting operation is recovered by a flashing operation. As another feature of this invention, further purification of the ammonia solvent to permit continuous recycle of the solvent is secured by washing, preferably at a reduced temperature, a recycle ammonia solvent stream with a relatively saturated hydrocarbon having a boiling point considerably different from the mixture undergoing extraction. In general, it is preferred that this hydrocarbon used for washing, or extracting the ammonia solvent, boil 200° F. or more from those initially extracted by the ammonia solvent. Thus, if the hydrocarbon mixture being extracted is a naphtha boiling in the range of 200° to 400° F., then the hydrocarbon used to wash or extract the ammonia solvent to enhance its purity, preferably should boil at about 600° F. or higher. Conversely, if the material undergoing extraction with ammonia solvents is a cycle stock from catalytic cracking boiling in the range from 400° to 700° F., then a hydrocarbon suitable for washing the solvent is one that boils around 200° F. and is relatively saturated, such as a naphthene or paraffin.

In order to fully disclose the nature of this invention, the basic characteristics and nature of the ammonia solvent employed will be described. In evaluating any particular solvent, a selectivity factor termed beta is generally employed. Beta is a numerical measure of the particular solvent's selectivity or the solvent's ability to preferentially dissolve one particular type of constituent to the exclusion of oher types of constituents. The beta or selectivity of any organic solvent is affected by addition of other materials to the solvent. However, as the solvent power of any solvent is increased by use of solvent modifiers, the selectivity or beta decreases to a marked extent. This, however, is not true of ammonia solvents, since addition of suitable solvent modifiers to ammonia may be carried out without adverse change in the selectivity or beta of the solvent. Thus, providing the solvent comprises ammonia and a modifying agent, it is possible to treat feed oils for the extraction of products which otherwise could not be extracted either by the use of ammonia alone or by means of closely related solvents. Ammonia is compatible with a variety of substances capable of varying its solvent power for hydrocarbons. When these modifying solvents for adjusting solvent power over a definite range are used, little, if any, loss in selectivity occurs, and there is substantially no increase in corrosiveness or in emulsion formation. Thus, in spite of the fact that no selective inorganic solvent in present use is susceptible to modifying solvents for altering solvent power without some of the previously noted disadvantages occurring, ammonia is compatible with a great many substances without such disadvantages and by proper choice of a modifying solvent, the ammonia solvents may be used for a great variety of hydrocarbon separations. It is possible to employ these ammonia solvents for selectively extracting hydrocarbons ranging from, say, ethane to relatively viscous oils. This is accomplished by adding modifying solvents to reduce or raise the dissolving capacity of the ammonia without greatly changing its other characteristics.

By employing modifying solvents of various types and in various amounts, it is possible to obtain any desired degree of solvent power for any particular hydrocarbon component. This principle is employed in the process of this invention by adjusting the solvent power of ammonia to secure the desired extraction at a temperature of about 60° to 150° F.

The amount of solvent modifying agent used may vary widely and will depend on general operating conditions and upon the particular feed stock being treated. In general, the solvent mixture should comprise from about 10 to 50 percent of a solvent modifying agent. Suitable modifying solvents can be chosen from a relatively large group. Any substance which will not be reactive under the extraction conditions, but which when added to the system will alter the solvent power of the ammonia may be used. Specific examples of solvent modifiers are: ethylene glycol, water, formamide, ethylene diamine, some aromatic hydrocarbons and paraffinic hydrocarbons to reduce the solvent power; higher glycols, ethers, and ether-alcohols, methanol and other alcohols, alcohol amines, aniline, pyridine, the methylamines and other low molecular weight aliphatic amines to raise the solvent power. Water, ethylene glycol, the methylamines, the lower molecular weight diamines, and higher molecular weight paraffinic or naphthenic hydrocarbons are especially effective. In some cases, it is advisable to add one type of modifying solvent in one zone of the extraction and another type at another zone, the resulting solvent being composed of three components: ammonia; a modifying solvent for increasing the solvent power; and one for decreasing it. In general, the solvent in the solvent phase will be composed predominantly of ammonia, i. e., about 50 percent by volume, such that the selectivity characteristics of the solvent are primarily that of the ammonia; only the solvent power is modified. Hence, it is not necessary that the modifying solvent be selective, it is only necessary that it alter the solvent power of the ammonia.

The amount of modifying solvent added depends upon the degree to which the solvent power should be changed, and hence upon the mixture being extracted and the particular modifying solvent used. Water is very potent in changing the solvent power and in general should not be used in concentrations above 20 percent. Ethylene glycol is most satisfactory in concentrations below 35 percent. In general, the methylamines are not used above a concentration of 50 percent.

Operating temperatures and pressures for extraction with the ammonia solvents may be chosen over a reasonable range. However, as indicated, the preferred temperature of extraction is about 60° to 150° F. The pressure should be sufficient to maintain all the constituents in the liquid state. In general, pressures of about 100 to 350 lbs. per square inch are satisfactory. The solvent to oil ratio will depend upon the mixture being treated and on the solubility of the components to be extracted in the solvent. In general, solvent to oil ratios of less than 10 to 1 are employed.

In treating the extract phase secured during contacting, the extract phase is cooled to a temperature of about +20° F. to —20° F. This temperature is suitable to secure the substantial precipitation or phase separation of hydrocarbons contained in the extract phase.

To exemplify the process of this invention, reference is made to the accompanying drawings diagrammatically illustrating flow plans embodying the principles of this invention. In these drawings, Figure I and Figure Ia together, diagrammatically represent an over-all processing system embodying the invention and Figure II illustrates a modification of the process shown in Figure I permitting washing of the recycled ammonia solvent to secure the removal of any residual hydrocarbons contained in the ammonia solvent.

Referring first to Figures I and Ia, the numeral 1 designates a liquid-liquid extraction column in which the ammonia solvent is contacted with the feed oil. Thus, extractor 1 may consist of the tower illustrated filled with any desired type of liquid-liquid contacting aid such as packing, perforated plates, etc. An oil feed to be treated in the process such as a catalytic cycle gas oil may be introduced to tower 1 through line 2 at an intermediate point of the tower. The ammonia solvent is introduced to the lower part of the tower through line 3. It is to be understood that the ammonia solvent comprises ammonia together with a suitable solvent modifier. For example, the ammonia solvent may consist of about 80 weight percent of ammonia and about 20 weight percent of methyl amine. The amonia introduced at the bottom of the extractor flows upwardly through the extractor, securing countercurrent contact with the oil feed so that an extract phase may be removed from the top of the tower through line 4. Unextracted portions of the oil feed, constituting the raffinate, are withdrawn from the bottom of the tower through line 5. Tower 1 may be operated, for example, at a temperature of about 140° F., and at a pressure of about 350 lbs. per square inch. If desired, a temperature gradient may be supplied along tower 1, particularly so as to maintain a somewhat lower temperature in the upper portion of the tower. Thus, one or more cooling coils 6 may be positioned in the top of the tower so that the liquid present in this portion of the tower is maintained at about 100° F., if the bottom is at 140° F.

As a particular feature of this process, the extract phase removed from tower 1 through line 4 is cooled to a temperature of about 0° F., to secure the precipitation or phase separation of the hydrocarbons contained in the extract phase. To secure this, it is desirable to temploy a heat exchanger 7 operative to provide in part the necessary cooling requirements; for example, to drop the temperature of the extract phase to about 20° F. The remaining cooling required may be achieved by passing the cooled extract phase into an adiabatic evaporator 8 maintained at a sufficiently low pressure to secure the flashing of a portion of the ammonia solvent. Thus, evaporator 8 may be maintained at a pressure of about 13 lbs. per square inch, causing the flashing of sufficient ammonia to drop the temperature of the extract phase to about 0° F. The ammonia flashed in the evaporator may be removed through line 9 for recycle to extraction tower 1. Thus, for this purpose the ammonia may be compressed in compressor 10 and passed through chiller 70 to secure the liquefaction of the ammonia which may be returned to storage drum 11 through line 12 for eventual return to extractor 1 through cooler 13 and line 3. In general, the amount of ammonia that has to be compressed and returned via line 12 is 5 percent or less of that in line 3.

The extract phase, having been cooled to a temperature of about 0° F., is removed from adiabatic evaporator 8 through line 15 and is conducted to settler 16. Settler 16 maintains the extract phase in a quiescent state to permit phase separation. Ammonia will separate as the upper phase and may be removed from the upper portion of settler 16 through line 17 for recycle to the extractor. The hydrocarbons constituting the extract will form a lower phase in settler 16 and may be removed through line 18.

The indicated cooling of the extract phase followed by settling of the extract phase is operative to secure the substantial separation of the extracted hydrocarbons from the ammonia solvent. In many types of extraction the ammonia removed from the settler has a hydrocarbon content below about 1 percent. As will be seen, the ammonia solvent may be further purified, if desired, according to the flow plan of Figure II of the drawing.

The extract phase removed from settler 16 through line 18 will also be relatively free of ammonia. However, to remove the residual amounts of the ammonia solvent remaining in the extract phase, the extract may be passed to a flash drum 19. By heating the extract to a temperature of about 320° F., by means of heat exchanger 20, on introduction to flash drum 19, residual ammonia solvent will be removed as an overhead product through line 21. This ammonia solvent may be condensed and cooled by heat exchanger 22 and may be passed to hot solvent drum 23 for eventual return to the extractor 1 through line 24. The extract will be removed from flash drum 19 as a bottoms product through line 25 and may be passed to a second flash drum 26. Again in flash drum 26 any remaining ammonia solvent is substantially removed as the overhead through line 27 for passage to compressor 10 and for recycle to the extractor. The final extract is then removed as the bottoms of flash drum 26 through line 28; it is cooled in heat exchanger 29, and is subjected to a water washing operation in wash drum 30. The water wash is operative to provide a final cleanup of the extract which may be separated from the water by phase separation in wash drum 30, permitting the finished extract to be removed from the upper level of drum 30 through line 31 and permitting the water to be removed from the bottom of the wash drum through line 32.

In a similar manner, the raffinate phase removed from extractor 1 through line 5 is processed. Thus, the raffinate phase of line 5 is heated in heat exchanger 35 and is introduced to flash drum 36. Ammonia solvent flashed from the raffinate is removed overhead through line 37, is cooled in heat exchanger 38 and is passed to hot solvent drum 23. The raffinate remaining in liquid phase is removed from the bottom of flash drum 36 through line 39 for passage to a second flash drum 40. Again in tower 40, ammonia solvent is flashed overhead to be removed as a vapor through line 41 for recycle to compressor 10 and extractor 1. The raffinate stream withdrawn from tower 40 through line 42 is cooled in heat exchanger 43 and is water washed in wash drum 44. The final raffinate is then removed from the system as the upper phase in wash drum 44 through line 45.

As described, therefore, the process of this invention entails the contacting of an oil feed stock with an ammonia solvent at moderately elevated temperatures. Solvent is freed from the extract phase secured by this contacting by cooling the extract phase to a temperature suitable for securing phase separation of the ammonia solvent and the hydrocarbon extract. The cooling is preferably achieved, at least in part, by flashing or adiabatic evaporation of a portion of the ammonia solvent. Thereafter the extract phase, and in a similar manner the raffinate phase, is purified and freed of residual ammonia solvent by a flashing operation preferably conducted in two stages. The final extract and raffinate are preferably water washed to provide the finished streams.

Figure 2:
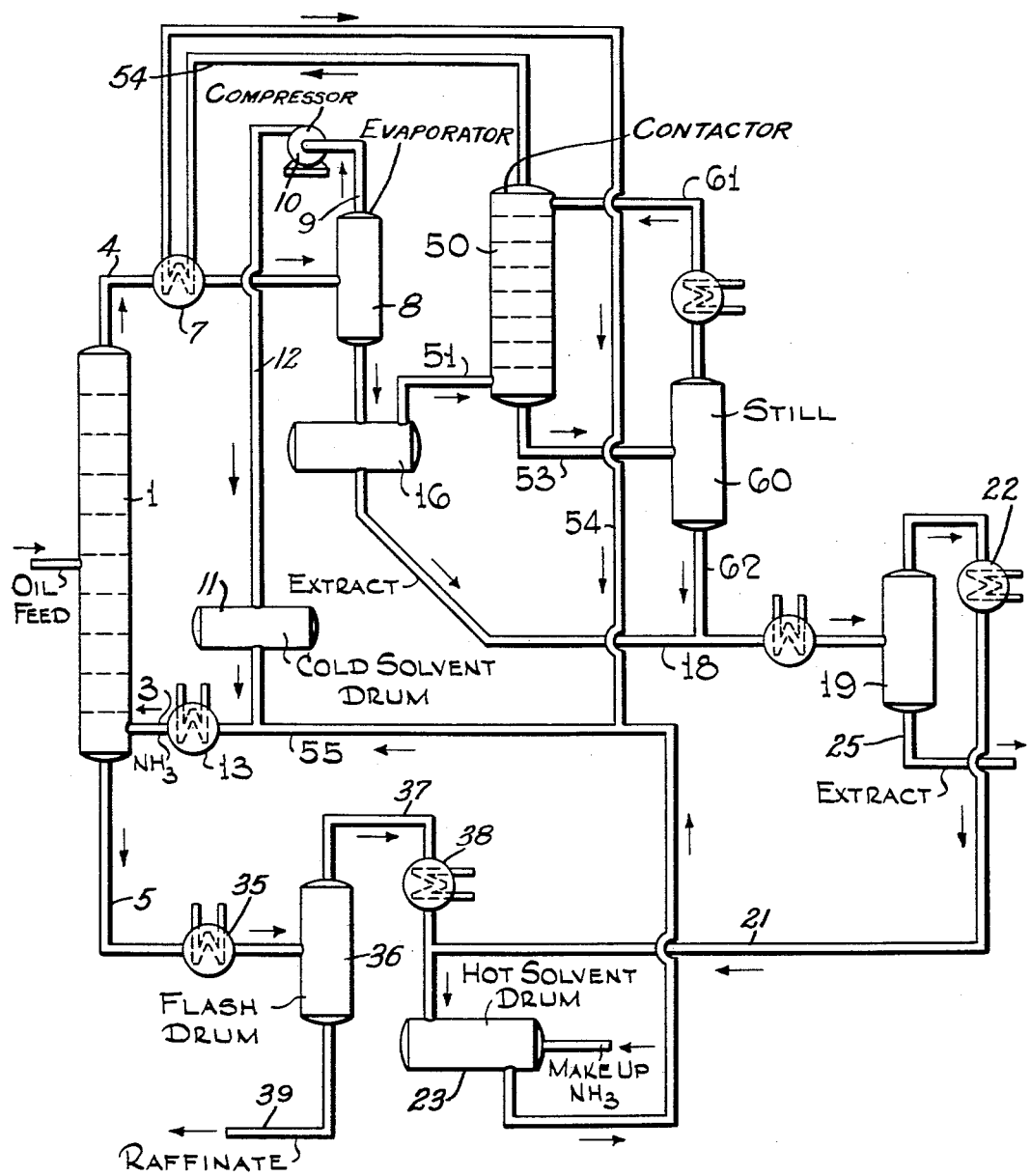

As indicated, in some applications complete removal of hydrocarbons from the ammonia solvent is not obtained by the indicated cooling. To secure substantially complete removal of hydrocarbons from the ammonia solvent to be recycled, the modification of the process illustrated in Figure II may be employed. In this figure processing features and apparatus of the nature shown in Figure I are identified by similar numerals. In the modification of Figure II the ammonia solvent removed as the upper phase from settler 16 is passed to a liquid-liquid contacting zone 50. Thus, the ammonia solvent may be introduced to a lower portion of contactor 50 through line 51. A low molecular weight paraffin such as a $C_6$ to $C_8$ normal or isoparaffin for example is introduced to the upper portion of contactor 50 through line 61. Suitable packing material or contacting trays are provided in contactor 50 to secure the effective liquid-liquid contacting of the paraffin with the ammonia solvent. A minor proportion of the saturated wash hydrocarbon, based on ammonia solvent is employed. The proportion may be about 12.5 to 100 percent or generally only about 20 to 50 percent of the ammonia solvent, by volume. The wash agent moving downwardly through contactor 50 countercurrently contacts the ammonia solvent moving upwardly through contactor 50. During this contacting the low molecular weight paraffin, such as heptane, for example, will scrub hydrocarbons from the ammonia solvent so that the heptane removed from the lower part of the contactor through line 53 will contain substantially all of the hydrocarbons remaining in the ammonia solvent. The ammonia solvent removed from the top of the contactor through line 54 is thus substantially purified and may be returned to extractor 1 through line 55, heat exchanger 13 and line 3. As will be brought out in the following examples, to reduce heat requirements of the process, it is desirable to pass the purified ammonia solvent of line 54 in heat exchange relation with the extract phase removed from extractor 1 through line 4. The stream of line 4 comprising the extract phase may be passed through heat exchanger 13 to accomplish this objective. Or the cold solvent stream of lines 17 (Fig. 1) or 54 (Fig. 2) may be passed through heat exchanger 7. Contactor 50 is preferably constructed and operated to provide several contacting stages to enable the effective and thorough cleanup of the ammonia solvent to be recycled.

The heptane, together with hydrocarbons extracted from the ammonia solvent, is passed to distillation zone 60 through line 53. Still 60 is operated to permit removal overhead of the low molecular weight paraffin such as heptane. The heptane is then recycled to contactor 50 through line 61. Operation of still 60 permits removal of hydrocarbons originally contained in the ammonia solvent through line 62. These hydrocarbons may be combined with the extract hydrocarbons of line 18, removed from settler 16, and may then be passed to flash drum 19 for processing as described in connection with Figure I.

As described, therefore, the modification of Figure II is employed to thoroughly remove any residual hydrocarbons from the ammonia solvent after initial phase separation in settler 16. By this means the process of Figure I may be adapted to the extraction of hydrocarbons which cannot be completely separated by the cooling operations described.

The following examples demonstrate the operability and advantages of the process of this invention:

*Example 1*

In the multi-stage extraction of a 200° to 450° F. naphtha produced by catalytic cracking, there was produced an 85 percent yield of aromatics in 92 percent purity by extracting with a solvent comprising ammonia containing 15 percent monomethylamine and 5 percent water. The solvent power of the solvent leaving this multi-stage extractor at 80° F. was adjusted so the solvent contained 25 percent of dissolved hydrocarbons, predominantly aromatics boiling in the 200 to 450° F. range. Six pounds of solvent were employed per pound of hydrocarbon fed to the extractor. The 25 percent solution of aromatics in the solvent was a saturated solution at 80° F. The solvent was adjusted to the composition stated so that the aromatics at 80° F. were limited in solubility in the solvent to this value. On cooling the solvent containing the dissolved hydrocarbons to 0° F. the amount of hydrocarbons dissolved in the solvent was reduced to 3 percent. That is, over 90 percent of the dissolved hydrocarbons were precipitated in this cooling step. Cooling was accomplished in part by evaporating ammonia and in part by heat exchange. This solvent containing 3 percent hydrocarbon was then extracted at 0° F. in a single extraction stage with one-eighth its volume of a saturated hydrocarbon of about 250 molecular weight. This reduced the hydrocarbon in the solvent to less than one percent, and the solvent was suitable for reuse in the multi-stage extractor without further treatment. This solvent before entering this extractor was used in heat exchange relationship with solvent coming from this extractor containing 25 percent of dissolved hydrocarbons and served to cool the rich solvent down to about 20° F. The final cooling from 20° F. to 0° F. was accomplished by evaporating ammonia. Thus only a very small part of the ammonia solvent had to be evaporated. The large bulk of it was reconditioned, or purified, for reuse with the expenditure of only a very small amount of heat energy in comparison with that required if all the solvent were evaporated to free it of dissolved hydrocarbons. Thus this process has a decided advantage in reducing operating costs.

*Example 2*

A cycle oil made by catalytic cracking was extracted in a multi-stage extractor using a solvent comprising liquid ammonia and 20 percent monomethyl amine. This cycle oil is the material left when the gasoline is removed from the product that results when a gas oil is cracked catalytically. It contained about 50 percent aromatics and its boiling range was 430° to 800° F. The solvent leaving the multi-stage extractor at 120° F. contained 20 percent aromatics. On cooling to 0° F. the aromatics left in the solvent amounted to 23 percent. When the hydrocarbons that precipitated were removed from the solvent by settling at 0° F. and then the solvent was contacted at 0° F. in a 4-stage extractor using one-sixth its volume of a saturated hydrocarbon of about 100 molecular weight, the hydrocarbons left in the solvent were reduced to 0.5 percent. The solvent from this extractor was then used directly in the multi-stage extractor to extract more cycle oil. Before entering this extractor it was used in a heat exchanger in the manner set forth in Example 1. Some of the paraffinic solvent of 100 molecular weight can be added to the main ammonia solvent stream as it is cooled to 0° F. to flux or reduce the viscosity of the aromatics that separate out of solution due to the cooling. This example again illustrates the effective way in which the ammonia solvent is purified for reuse without the expenditure of an inordinate amount of heat energy that otherwise would be required if the solvents were wholly evaporated.

It is apparent that the process and apparatus described are subject to a great many modifications within the scope of this invention. For example, batch contactors and batch separators may be employed in place of the countercurrent contacting towers described. Again, for example, any desired number of contacting or separation stages may be employed. Consequently, the scope of this invention is to be measured by the appended claims rather than by the illustrative disclosures of processes embodying this invention.

What is claimed is:

1. In a process for separating a mineral oil into relatively more and relatively less extractable components containing different chemical constituents by contacting said oil at a temperature between about 60 and 150° F. with a liquid solvent comprising predominantly ammonia and capable of forming a raffinate phase composed predominantly of the relatively less extractable oil components and an extract phase containing not more than about 25% of the relatively more extractable components under the conditions of extraction, the improvement which comprises withdrawing said extract phase, cooling said extract phase to a temperature below about 20° F. and low enough to precipitate at least about 90% of the dissolved hydrocarbons from the ammonia solvent, and removing the resulting regenerated ammonia solvent from the precipitated hydrocarbon extract.

2. In a process for separating a mineral oil into fractions of different chemical properties by contacting said oil at a temperature between about 60 and 150° F. and a pressure of about 100 to 350 pounds per square inch with a solvent comprising about 50 to 90% of ammonia and about 50 to 10% of at least one modifying solvent whereby a solvent-rich aromatic hydrocarbon extract phase and a predominantly non-aromatic raffinate phase are formed and separated, the improvement which comprises cooling the separated extract phase to a temperature between about 20 and —40° F. and low enough to form a precipitated hydrocarbon layer and an ammonia solvent layer containing not more than about 3% of dissolved hydrocarbons, removing the resulting regenerated solvent layer from the precipitated aromatic hydrocarbon extract, and thereafter separating residual solvent from both the said aromatic hydrocarbon extract and the aforesaid non-aromatic raffinate phase by heating to flash off ammonia solvent as an overhead stream.

3. The process according to claim 2 wherein the modifying solvent comprises a low molecular weight amine.

4. The process according to claim 2 wherein the modifying solvent is monomethylamine.

5. The process according to claim 2 wherein the mineral oil being extracted is a cycle stock boiling above about 400° F.

6. The process according to claim 2 wherein the mineral oil being extracted is a naphtha boiling between about 200 and 450° F.

7. A process for separating a hydrocarbon oil into a relatively aromatic hydrocarbon extract and a relatively non-aromatic hydrocarbon raffinate which comprises contacting said oil in a main extraction zone at a temperature between about 60 and 150° F. with a composite solvent comprising about 50 to 90% of liquefied ammonia and about 50 to 10% of at least one modifying solvent selected from the group consisting of water, alcohols, glycols, ethers, low molecular weight aliphatic amines, aniline and pyridine, the solubility of extractable components in the composite solvent being kept between about 20 to 25% under the conditions of extraction, withdrawing from said extraction zone a relatively non-aromatic raffinate phase and an extract phase which contains about 20 to 25% of the relatively aromatic hydrocarbon extract dissolved in the ammonia solvent, refrigerating the withdrawn extract phase to a phase separation temperature between 20 and —40° F. at least in part by adiabatic evaporation of a minor proportion of the ammonia present in the withdrawn extract phase, segregating the resulting solvent layer from the precipitated aromatic extract, contacting said segregated solvent layer in an auxiliary extraction zone substantially at said phase separation temperature with a substantially saturated hydrocarbon boiling at a temperature at least 200° F. different from the boiling temperature of the hydrocarbons originally dissolved in the solvent, separating the resulting hydrocarbon layer from the resulting purified solvent, and recycling the purified solvent to the main extraction zone.

8. The process according to claim 7 wherein the segregated aromatic extract layer and the non-aromatic raffinate phase are separately heated to release therefrom residual ammonia solvent.

9. The process according to claim 7 wherein the cool purified solvent is passed in indirect heat exchange relation with the extract phase withdrawn from the main extraction zone, whereby the purified solvent is warmed up prior to reuse in the main extraction zone and the extract phase is precooled prior to the refrigeration step.

10. The process according to claim 7 wherein the mineral oil being extracted is a catalytically cracked cycle stock boiling at a temperature above about 400° F. and the relatively saturated hydrocarbon used in the auxiliary extraction zone is a $C_6$–$C_8$ paraffin, the said paraffin being used in a volume equal to about 12.5 to 100% of the volume of the ammonia solvent being contacted therewith.

11. The process according to claim 10 wherein at least a part of the said $C_6$–$C_8$ paraffin is added to the extract phase prior to refrigeration, whereby the viscosity of the extract phase is reduced.

12. The process according to claim 9 wherein the mineral oil being extracted is a catalytically cracked naphtha boiling in the range of about 200 to 450° F. and the relatively saturated hydrocarbon used in the auxiliary extraction zone boils at a temperature above about 600° F., the said relatively saturated hydrocarbon being used in a volume equal to about 12.5 to 50% of the volume of the ammonia solvent being contacted therewith.

13. The process according to claim 9 wherein the ammonia solvent comprises about 10 to 50% of a methylamine.

14. The process according to claim 10 wherein up to about 5% of the ammonia solvent present in the extract phase is evaporated in the refrigeration step, and the evaporated solvent is compressed and cooled for reuse in the extraction step.

15. In a process for separating a catalytically cracked cycle oil boiling between about 430 and 800° F. into a relatively aromatic hydrocarbon extract and a relatively non-aromatic hydrocarbon raffinate by countercurrently contacting said oil in a main extraction zone with a liquid ammonia solvent comprising about 50 to 90% ammonia and 50 to 10% monomethylamine at a temperature between about 60 and 150° F. and a pressure between about 100 and 350 pounds per square inch and withdrawing from said extraction zone a non-aromatic hydrocarbon raffinate phase and an extract phase which contains about 20 to 25% of the relatively aromatic hydrocarbon extract dissolved in said ammonia solvent, the improvement which comprises diluting the withdrawn extract phase with a $C_6$–$C_8$ paraffin to reduce its viscosity, separating the diluted extract phase into a hydrocarbon layer containing at least about 90% of the hydrocarbons originally dissolved in the extract base and a solvent layer relatively free from dissolved hydrocarbons by refrigerating the diluted extract phase to a phase separation temperature between about 0 and −40° F. in part by indirect heat exchange and in part by adiabatic evaporation of up to about 5% of the solvent present in the extract phase, compressing and condensing the evaporated solvent for recycling to the main extraction zone, segregating a solvent layer and a precipitated aromatic hydrocarbon extract from the refrigerated extract phase, contacting said segregated solvent layer in an auxiliary extraction zone substantially at said phase separation temperature with ⅛ to ½ times its volume of a $C_6$ to $C_8$ paraffin, separating the resulting hydrocarbon layer from the resulting purified solvent, passing the cold purified solvent in indirect heat exchange relation with the warm extract phase withdrawn from the main extraction zone, separately heating the non-aromatic raffinate phase and the precipitated aromatic hydrocarbon extract to recover residual ammonia solvent therefrom, and recycling the purified and recovered solvent to the main extraction zone.

16. In a process for separating a mineral oil into relatively more and relatively less extractable components containing different chemical constituents by contacting said oil at a temperature between about 60 and 150° F. in a primary extraction zone with a liquid solvent comprising predominantly ammonia and capable of forming a raffinate phase composed predominantly of the relatively less extractable oil components and an extract phase containing not more than about 25% of the relatively more extractable components under the conditions of extraction, the improvement which comprises withdrawing said extract phase, cooling said extract phase to a phase separation temperature below about 20° F., removing the resulting concentrated solvent layer from the precipitated hydrocarbon extract, contacting said removed solvent layer in an auxiliary extraction zone with a substantially saturated hydrocarbon having a boiling temperature at least 200° F. different from the boiling temperature of the hydrocarbons originally extracted with the solvent, separating the resulting hydrocarbon layer from the resulting purified solvent, and recycling the purified solvent to the main extraction zone.

References Cited in the file of this patent

UNITED STATES PATENTS

| | | |
|---|---|---|
| 1,893,733 | Deanesly | Jan. 10, 1933 |
| 1,912,349 | Tuttle | May 30, 1933 |
| 1,974,725 | Rosenstein | Sept. 25, 1934 |
| 2,031,205 | Bray | Feb. 18, 1936 |
| 2,081,720 | Van Dijck | May 25, 1937 |
| 2,092,199 | Arveson | Sept. 7, 1937 |
| 2,095,972 | Faragher | Oct. 19, 1937 |
| 2,096,725 | Andrews et al. | Oct. 26, 1937 |
| 2,106,234 | Bray | Jan. 25, 1938 |
| 2,114,524 | Egli | Apr. 19, 1938 |
| 2,146,679 | Koenemann et al. | Feb. 7, 1939 |
| 2,286,823 | McMillan | June 16, 1942 |
| 2,361,080 | Bolt et al. | Oct. 24, 1944 |
| 2,396,299 | Sweeney et al. | Mar. 12, 1946 |

FOREIGN PATENTS

| | | |
|---|---|---|
| 410,169 | Germany | Feb. 25, 1925 |